(12) United States Patent
Qi

(10) Patent No.: US 11,509,438 B2
(45) Date of Patent: Nov. 22, 2022

(54) METHOD AND APPARATUS FOR IMPROVING IN AND RELATING TO REFERENCE SIGNALS IN A TELECOMMUNICATION NETWORK

(71) Applicant: Samsung Electronics Co., Ltd., Suwon-si (KR)

(72) Inventor: Yinan Qi, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/054,129

(22) PCT Filed: May 10, 2019

(86) PCT No.: PCT/KR2019/005602
§ 371 (c)(1),
(2) Date: Nov. 9, 2020

(87) PCT Pub. No.: WO2019/216677
PCT Pub. Date: Nov. 14, 2019

(65) Prior Publication Data
US 2021/0194649 A1     Jun. 24, 2021

(30) Foreign Application Priority Data
May 11, 2018 (GB) .................................... 1807654

(51) Int. Cl.
*H04L 5/00* (2006.01)
*H04L 1/00* (2006.01)
*H04L 27/26* (2006.01)

(52) U.S. Cl.
CPC ............ *H04L 5/005* (2013.01); *H04L 1/0003* (2013.01); *H04L 1/0023* (2013.01);
(Continued)

(58) Field of Classification Search
CPC ... H04L 1/0003; H04L 1/0023; H04L 27/261; H04L 27/2613; H04L 5/0048;
(Continued)

(56) References Cited

U.S. PATENT DOCUMENTS

2013/0294333 A1* 11/2013 Chen ..................... H04W 28/06
                                                              370/328
2018/0219606 A1*  8/2018 Ng ......................... H04L 5/0048
(Continued)

FOREIGN PATENT DOCUMENTS

EP         3407523 A1    11/2018
GB         2569699 A      6/2019
(Continued)

OTHER PUBLICATIONS

Supplementary Partial European Search Report dated Apr. 21, 2021 in connection with European Application No. 19799000.5, 13 pages.
(Continued)

*Primary Examiner* — Stephen J Clawson

(57) ABSTRACT

The present disclosure relates to a pre-5th-Generation (5G) or 5G communication system to be provided for supporting higher data rates Beyond 4th-Generation (4G) communication system such as Long-Term Evolution (LTE). Disclosed is a method of configuring a reference signal for a stationary wireless link in a wireless network, wherein the method of configuring comprises the step of: activating a reference signal overhead reduction mode if a predetermined condition is met.

10 Claims, 4 Drawing Sheets

(52) U.S. Cl.
CPC .......... *H04L 5/0053* (2013.01); *H04L 5/0094* (2013.01); *H04L 27/2613* (2013.01)

(58) Field of Classification Search
CPC ..... H04L 5/005; H04L 5/0053; H04L 5/0091; H04L 5/0094; H04L 69/22; H04W 28/06
See application file for complete search history.

(56) References Cited

U.S. PATENT DOCUMENTS

2019/0222385 A1* 7/2019 Hessler ............... H04L 27/2613
2020/0351053 A1* 11/2020 Werner ................ H04L 5/0048

FOREIGN PATENT DOCUMENTS

| WO | 2013023093 | A2 | 2/2013 |
| WO | 2014/161142 | A1 | 10/2014 |
| WO | 2014/168574 | A1 | 10/2014 |
| WO | 2018/027222 | A1 | 2/2018 |
| WO | 2018/044715 | A1 | 3/2018 |
| WO | 2018/063042 | A1 | 4/2018 |

OTHER PUBLICATIONS

Intel Corporation, "Overhead reduction for DM-RS," R1-1707314, 3GPP TSG RAN WG1 Meeting #89, Hangzhou, China, May 15-19, 2017, 2 pages.
ZTE, "Considerations for LTE Downlink DMRS Overhead Reduction," R1-1707187, 3GPP TSG RAN WG1 Meeting #89, Hangzhou, China, May 15-19, 2017, 5 pages.
Supplementary European Search Report dated Aug. 4, 2021 in connection with European Application No. 19799000.5, 17 pages.
Ericsson, "On PTRS performance," R1-1703221, 3GPP TSG RAN WG1 #88, Athens, Greece, Feb. 13-17, 2017, 9 pages.
Huawei, et al., "Further details for PT-RS design," R1-1701698, 3GPP TSG RAN WG1 Meeting #88, Athens, Greece, Feb. 13-17, 2017, 3 pages.
MCC Support, "Final Report of 3GPP RSG RAN WG1 #89 v1.0.0 (Hangzhou, China, May 15-19, 2017)," R1-1712031, 3GPP TSG RAN WG1 Meeting #90, Prague, Czech Republic, Aug. 21-25, 2017, 165 pages.
MCC Support, "Draft Report of 3GPP TSG RAN WG1 #91 v0.2.0 (Reno, USA, Nov. 27- Dec. 1, 2017)," R1-180xxxx, 3GPP TSG RAN WG1 Meeting #92, Athens, Greece, Feb. 26-Mar. 2, 2018, 208 pages.
Satoshi Nagata, Status Report for Ran WG1 to TSG-RAN #76, RP-170858, 3GPP TSG RAN #76, Florida, USA, Jun. 5-8, 2017, 35 pages.
Panasonic, "Discussion on PT-RS for DL," R1-1702297, 3GPP TSG RAN WG1 Meeting #88, Athens, Greece, Feb. 13-17, 2017, 3 pages.
Qualcomm Incorporated, "Discussion on Bursty Interference Measurement Resources", 3GPP TSG RAN WG1 Meeting 90bis, Oct. 9-13, 2017, R1-1718552, 6 pages.
"3rd Generation Partnership Project; Technical Specification Group Radio Access Network; Evolved Universal Terrestrial Radio Access (E-UTRA); Physical layer procedures (Release 16)", 3GPP TS 36.213 V16.3.0 (Sep. 2020), 413 pages.
Samsung, "Issues on PTRS", 3GPP TSG RAN WG1 Meeting AH 1801, Jan. 22-26, 2017, R1-1800438, 5 pages.
Spreadtrum Communications, "Remaining issues on PT-RS", 3GPP TSG RAN WG1 Meeting #92bis, Apr. 16-20, 2018, R1-1804216, 11 pages.
Intel Corporation, "Remaining Issues on PT-RS", 3GPP TSG RAN WG1 Meeting #92bis, Apr. 16-20, 2018, R1-1804721, 9 pages.
Intel Corporation, "Remaining Details on PT-RS", 3GPP TSG RAN WG1 Meeting 90bis, Oct. 9-13, 2017, R1-1717374, 10 pages.
Combined Search and Examination Report under Sections 17 and 18(3) dated Aug. 24, 2018 in connection with United Kingdom Patent Application No. GB1807654.7, 7 pages.
Combined Search and Examination Report under Sections 17 and 18(3) dated Sep. 11, 2019 in connection with United Kingdom Patent Application No. GB1807654.7, 3 pages.
International Search Report dated Aug. 21, 2019 in connection with International Patent Application No. PCT/KR2019/005602, 3 pages.
Written Opinion of the International Searching Authority dated Aug. 21, 2019 in connection with International Patent Application No. PCT/KR2019/005602, 6 pages.
Examination Report dated Oct. 15, 2021, in connection with United Kingdom Application No. GB1807654.7, 3 pages.
Examination Report dated Dec. 9, 2020, in connection with United Kingdom Application No. GB1807654.7, 2 pages.
Communication pursuant to Article 94(3) EPC dated Aug. 17, 2022 in connection with European Patent Application No. 19 799 000.5, 5 pages.

* cited by examiner

[Fig. 1]
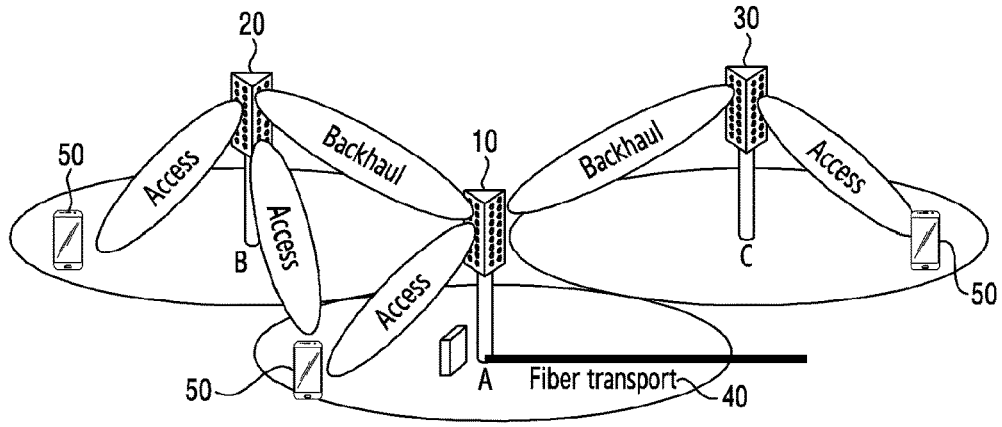
[Fig. 2]
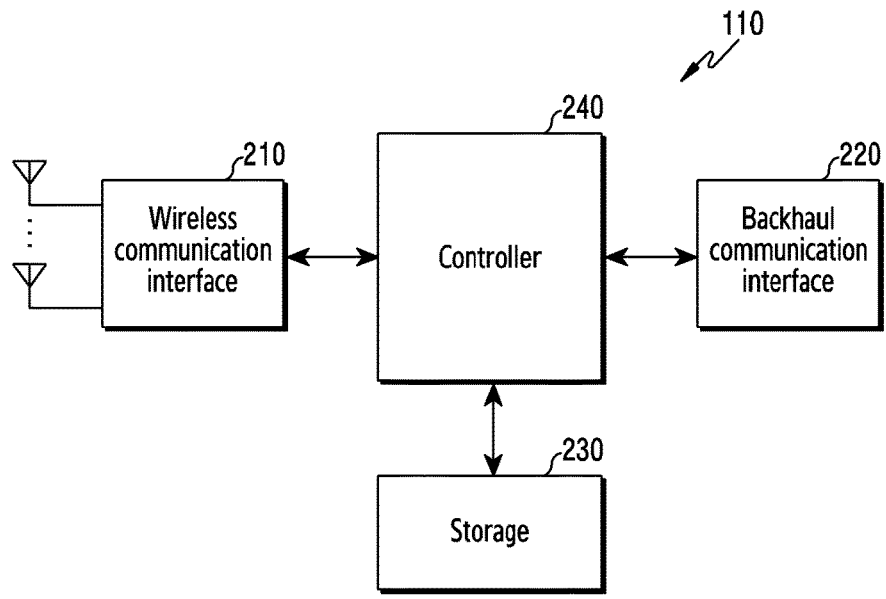
[Fig. 3]
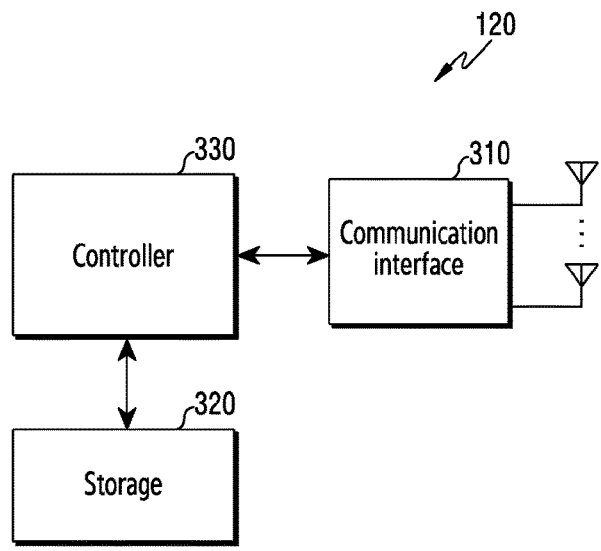

[Fig. 4]
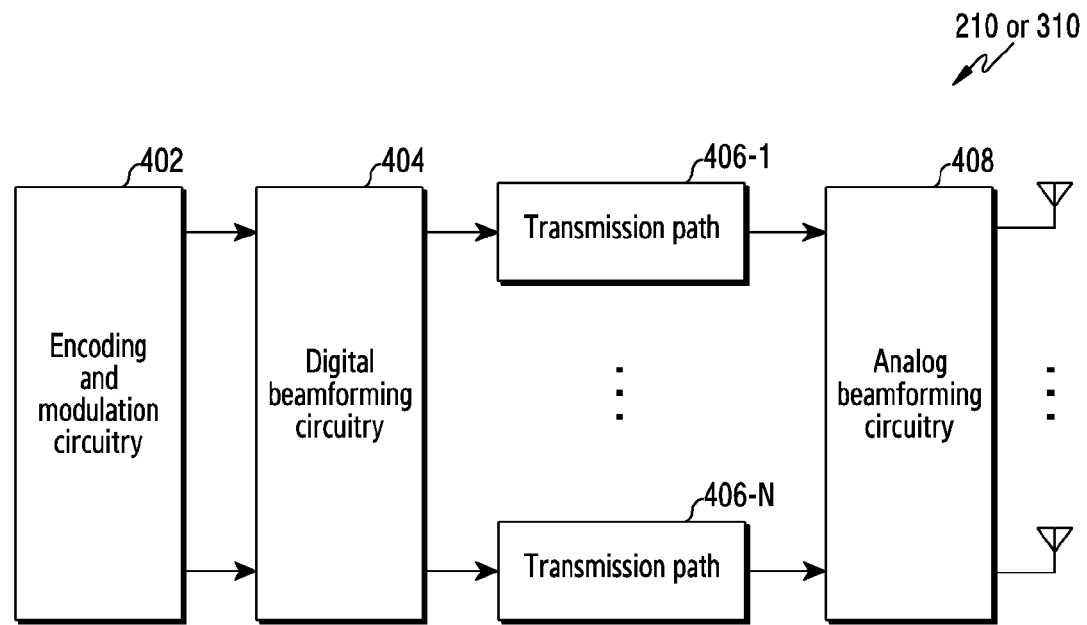
[Fig. 5]
| (a) | (b) | (a) | (b) |
|---|---|---|---|
| 2/3 | 2/3/6/7 | 4/5 | 4/5/10/11 |
| 0/1 | 0/1/4/5 | 4/5 | 4/5/10/11 |
| 2/3 | 2/3/6/7 | 2/3 | 2/3/8/9 |
| 0/1 | 0/1/4/5 | 2/3 | 2/3/8/9 |
| 2/3 | 2/3/6/7 | 0/1 | 0/1/6/7 |
| 0/1 | 0/1/4/5 | 0/1 | 0/1/6/7 |
| 2/3 | 2/3/6/7 | 4/5 | 4/5/10/11 |
| 0/1 | 0/1/4/5 | 4/5 | 4/5/10/11 |
| 2/3 | 2/3/6/7 | 2/3 | 2/3/8/9 |
| 0/1 | 0/1/4/5 | 2/3 | 2/3/8/9 |
| 2/3 | 2/3/6/7 | 0/1 | 0/1/6/7 |
| 0/1 | 0/1/4/5 | 0/1 | 0/1/6/7 |
DMRS Configuration Type 1  DMRS Configuration Type 2

[Fig. 6]
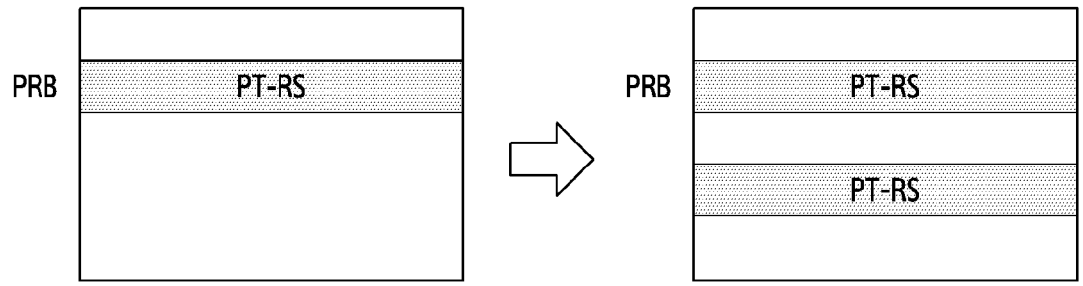
[Fig. 7]
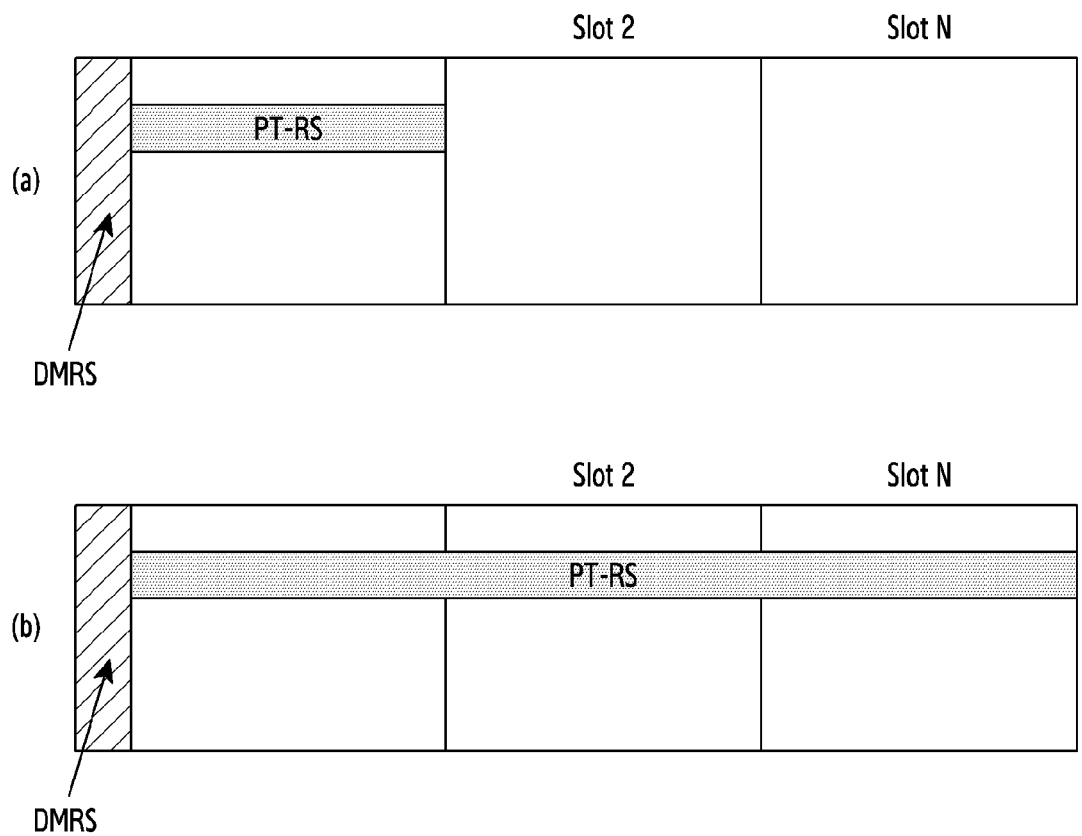

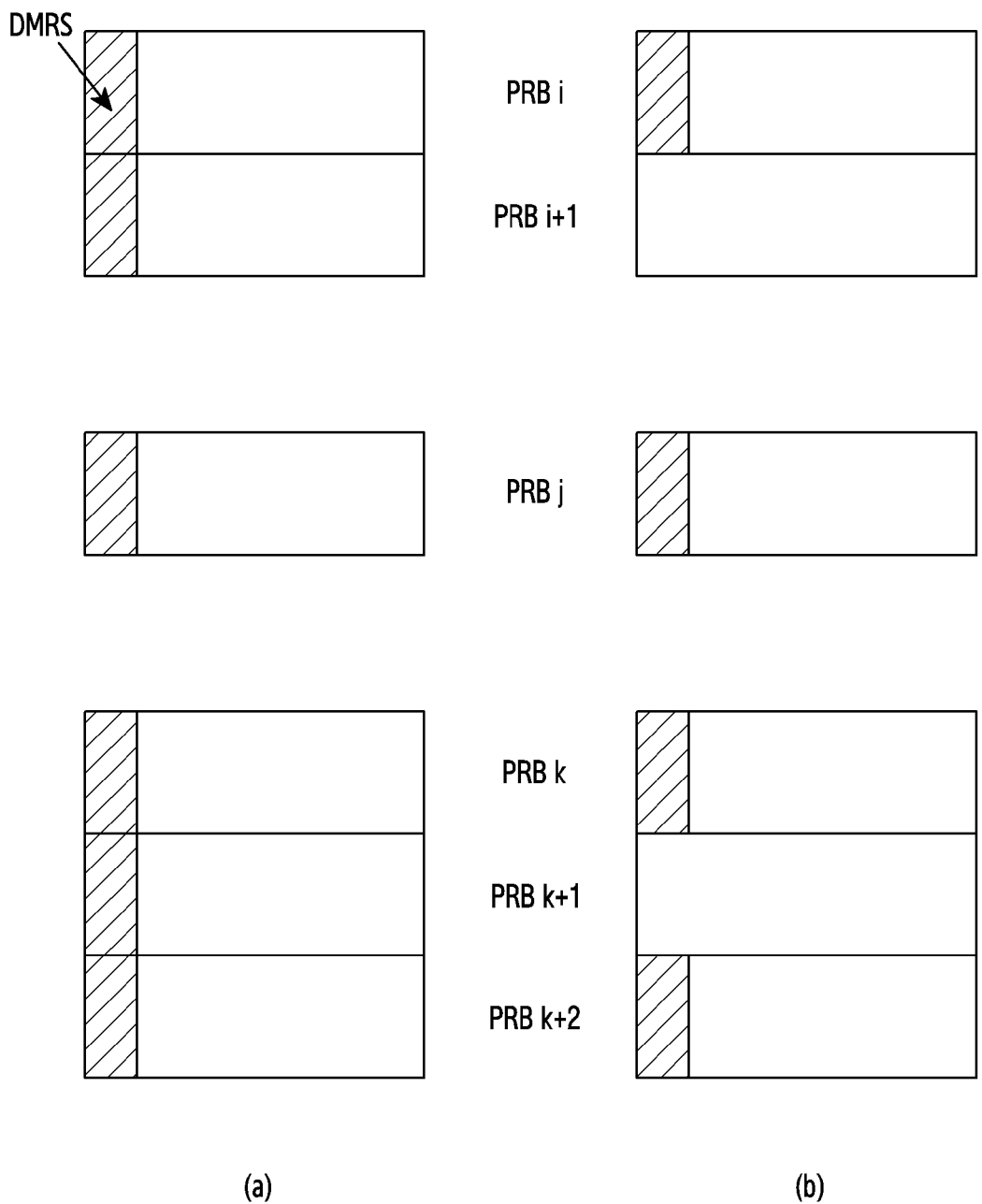
[Fig. 8]

METHOD AND APPARATUS FOR IMPROVING IN AND RELATING TO REFERENCE SIGNALS IN A TELECOMMUNICATION NETWORK

CROSS-REFERENCE TO RELATED APPLICATION

This application is a 371 of International Application No. PCT/KR2019/005602 filed on May 10, 2019, which claims priority to United Kingdom Patent Application No. 1807654.7 filed on May 11, 2018, the disclosures of which are herein incorporated by reference in their entirety.

BACKGROUND

1. Field

The present disclosure relates to improvements in the configuration of various reference signals used in a telecommunication network. In particular, it relates to reference signals used in Fifth Generation (5G) or New Radio (NR) networks, especially in cases where there is little or no time variation in the channel.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long-Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In order to cater for high capacity stationary wireless links, the introduction of new modulation schemes such as 1024 QAM has been agreed. As a part of this process, channel quality indicator (CQI) and modulation coding scheme (MCS) tables (as defined in TS 36.213) are updated such as those below have been proposed and/or approved:

TABLE 1

| CQI index | modulation | code rate × 1024 × $R^{CSI}$ | Efficiency × $R^{CSI}$ |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 616 | 2.4063 |
| 6 | 64QAM | 567 | 3.3223 |
| 7 | 64QAM | 666 | 3.9023 |
| 8 | 64QAM | 772 | 4.5234 |
| 9 | 64QAM | 873 | 5.1152 |
| 10 | 256QAM | 711 | 5.5547 |
| 11 | 256QAM | 797 | 6.2266 |
| 12 | 256QAM | 885 | 6.9141 |
| 13 | 256QAM | 948 | 7.4063 |
| 14 | 1024QAM | 853 | 8.3321 |
| 15 | 1024QAM | 948 | 9.2578 |

The two final rows relating to modulation 1024QAM are newly introduced as a part of this process.

TABLE 2

| MCS Index $I_{MCS}$ | Modulation Order $Q_m$ | Modulation Order $Q'_m$ | TBS Index $I_{TBS}$ |
|---|---|---|---|
| 0 | 2 | 2 | 0 |
| 1 | 2 | 2 | 2 |
| 2 | 2 | 2 | 4 |
| 3 | 2 | 4 | 6 |
| 4 | 2 | 4 | 8 |
| 5 | 4 | 6 | 11 |
| 6 | 4 | 6 | 13 |
| 7 | 4 | 8 | 15 |
| 8 | 6 | 8 | 16 |
| 9 | 6 | 8 | 18 |
| 10 | 6 | 8 | 20 |
| 11 | 6 | 8 | 21 |
| 12 | 6 | 8 | 22 |
| 13 | 6 | 8 | 23 |
| 14 | 6 | 8 | 24 |
| 15 | 8 | 8 | 25 |
| 16 | 8 | 8 | 27 |
| 17 | 8 | 8 | 28 |
| 18 | 8 | 8 | 29 |
| 19 | 8 | 8 | 30 |
| 20 | 8 | 8 | 31 |
| 21 | 8 | 8 | 32 |
| 22 | 8 | 8 | 33/33A/33B |
| 23 | 10 | 10 | 34A |
| 24 | 10 | 10 | 35 |
| 25 | 10 | 10 | 36 |
| 26 | 10 | 10 | 37A/37 |
| 27 | 2 | 2 | reserved |
| 28 | 4 | 4 | |
| 29 | 6 | 6 | |
| 30 | 8 | 8 | |
| 31 | 10 | 10 | |

The rows relating to MCS Index 23-26 and 31 are newly introduced as a part of this process.

It is expected that very high order modulation, e.g., 1024 QAM, will also be adopted to effect capacity enhancement in NR even though only 256 QAM is specified in the prior art. One of the scenarios for such high order modulation is a stationary wireless link as specified in Rel-15 LTE.

For NR, a stationary wireless link is a typical use case in an integrated access and backhaul (IAB) network, where the relay nodes are fixed and thus the backhaul links are stationary wireless links.

In addition, since the backhaul links are mostly line of sight (LOS) links and the channel condition is usually good, very high order modulation can be adopted for the purposes of capacity enhancement. However, the prior art design for LTE cannot be directly applied to NR systems due to the many differences in the network design. Unlike the channel between a user equipment (UE) and a base station, which is subject to often highly variable conditions, backhaul links are more predictable and not usually subject to the same variations seen in UE links.

In addition, stationary wireless links can also exist in non-terrestrial networks (NTN), where the links could be LOS. NTNs can include e.g. airborne base stations on an airship or satellite.

SUMMARY

Embodiments of the present disclosure aim to address issues with reference signals particularly for use with higher order modulation schemes.

According to the present disclosure there is provided an apparatus and method as set forth in the appended claims. Other features of the disclosure will be apparent from the dependent claims, and the description which follows.

According to a first aspect of the present disclosure, there is provided a method of configuring a reference signal for a stationary wireless link in a wireless network, wherein the method of configuring comprises the step of: activating a reference signal overhead reduction mode if a predetermined condition is met.

According to a second aspect of the present disclosure, there is provided a method of reducing a signalling overhead associated a reference signal. In particular, it relates to DM-RS and various embodiments are presented. The change in DM-RS configuration has an effect on PT-RS and so consequential changes to it are disclosed.

In an embodiment, the predetermined condition comprises one of: a message received at a UE from the wireless network; or previously measured channel conditions.

In an embodiment, the step of activating the reference signal overhead reduction mode further comprises the step of: utilising orthogonal cover code to encode the reference signal so as to reduce the signaling overhead associate therewith.

In an embodiment, orthogonal cover code is utilised across a plurality of domains selected from: time, frequency and code.

In an embodiment, the step of activating the reference signal overhead reduction mode further comprises the step of: determining a number of adjacent allocated physical resource blocks and if the number exceeds a predetermined threshold, removing the reference signal from at least one of the adjacent allocated physical resource blocks.

In an embodiment, the step of removing the reference signal from at least one of the adjacent allocated physical resource blocks is performed according to one of the following schemes: in a predefined manner; in an implicit manner, based on an external parameter; in an explicit manner by a signal received at a UE.

In an embodiment, the predefined manner includes pre-storing instructions in the UE.

In an embodiment, the external parameter is selected from one of modulation order or MCS level.

In an embodiment, the signal may be received at the UE as a result of RRC, MAC CE or DCI signaling.

In an embodiment, the reference signal is one of DM-RS, CSI-RS, SRS and TRS.

In an embodiment, the reference signal is DM-RS.

In an embodiment, a PT-RS reference signal included in a first slot or subframe is extended across adjacent slots or subframes, wherein the adjacent slots or subframes do not include DM-RS.

In an embodiment, PT-RS RB and RE offsets are chosen to maintain an association of DM-RS and PT-RS.

According to a third aspect of the present disclosure, there is provided a method of configuring a Phase Tracking Reference signal, PT-RS, for a stationary wireless link in a wireless network, wherein the method of configuring comprises the step of: providing PT-RS more than once in a given physical resource block.

In an embodiment, a series of thresholds are determined whereby the number of occurrences of PT-RS per physical resource block are determined on the basis of either scheduled Modulation Coding Scheme or Scheduled Bandwidth.

In an embodiment, the step of: configuring more than one PT-RS port to be associated and configured for one DM-RS port group; and multiple PT-RS ports can be associated with the same DM-RS port or different DM-RS ports within one DM-RS port group.

In an embodiment, there is further provided the step of configuring both localized and distributed PT-RS patterns via explicit signaling, either semi-persistently by upper layer signaling or dynamically.

In an embodiment, there is further provided the step of configuring both localized and distributed PT-RS patterns implicitly via MCS level indicated in DCI.

BRIEF DESCRIPTION OF THE DRAWINGS

Although a few preferred embodiments of the present disclosure have been shown and described, it will be appreciated by those skilled in the art that various changes and modifications might be made without departing from the scope of the disclosure, as defined in the appended claims.

For a better understanding of the disclosure, and to show how embodiments of the same may be carried into effect, reference will now be made, by way of example only, to the accompanying diagrammatic drawings in which:

FIG. 1 shows a typical network setup using IAB;

FIG. 2 illustrates the BS in the wireless communication system according to various embodiments of the present disclosure;

FIG. 3 illustrates the terminal in the wireless communication system according to various embodiments of the present disclosure;

FIG. 4 illustrates the communication interface in the wireless communication system according to various embodiments of the present disclosure;

FIG. 5 shows details of different DM-RS configuration types;

FIG. 6 shows how a PRB may be updated to include multiple PT-RS according to an embodiment of the present disclosure;

FIG. 7 shows how PT-RS can be extended across multiple subframes or slots according to an embodiment of the present disclosure; and FIG. 8 shows how DM-RS may be omitted from amongst multiple adjacent PRBs according to an embodiment of the present disclosure.

DETAILED DESCRIPTION

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

The terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

FIG. 1 illustrates a network setup using IAB according to various embodiments of the present disclosure. In FIG. 1, each of three base stations 10, 20, 30 is connected to one or more terminals 50. Base station 10 is provided with a fibre connection 40 to the core network. Base stations 20, 30 do not have such a wired connection and make use of the Access spectrum to provide backhaul connections to the wired base station 10, which then transmits/receives the required data to/from the core network.

The BS 10, 20, 30 is network infrastructure that provides wireless access to the terminals 50. The BS 10, 20, 30 has coverage defined as a predetermined geographical region based on the distance at which a signal can be transmitted. The BS 10, 20, 30 may be referred to as "access point (AP)," "eNodeB (eNB)," "5th generation (5G) node," "wireless point," "transmission/reception Point (TRP)" as well as "base station." Especially, The BS 20, 30 may be referred to as "relay node" or "relay transmission/reception Point (rTRP)."

Each of the terminals 50 is a device used by a user, and performs communication with the BS 10, 20, 30 through a wireless channel. Depending on the case, at least one of the terminals 50 may operate without user involvement. That is, at least one of the terminals 50 is a device that performs machine-type communication (MTC) and may not be carried by the user. Each of the terminals 50 may be referred to as "user equipment (UE)," "mobile station," "subscriber station," "remote terminal," "wireless terminal," or "user device" as well as "terminal."

The BS 10, 20, 300 and the terminal 50 may transmit and receive wireless signals in millimeter wave (mmWave) bands (for example, 28 GHz, 30 GHz, 38 GHz, and 60 GHz). At this time, in order to improve a channel gain, the BS 10, 20, 30 and the terminal 50 may perform beamforming. The beamforming may include transmission beamforming and reception beamforming. That is, the BS 10, 20, 30, and the terminal 50 may assign directivity to a transmission signal and a reception signal. To this end, the BS 10, 20, 30 and the terminals 50 may select serving beams through a beam search procedure or a beam management procedure. After that, communications may be performed using resources having a quasi-co-located relationship with resources carrying the serving beams.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel to terminals 50 or from terminals 50. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into a Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams. The backhaul communication interface 220 may be a wireless communication interface.

The storage unit 230 stores a basic program, an application, and data such as setting information for the operation of the BS 10, 20, 30. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor. According to various embodiments, the controller 240 may include PTRS mapping function. Here, the PTRS mapping function may be a command/code temporarily resided in the controller 240, a storage space that stores the command/code, or a part of circuitry of the controller 240.

According to exemplary embodiments of the present disclosure, the controller 240 may determine offset of RE for mapping a PTRS and transmit related information to UEs. For example, the controller 240 may control the base station to perform operations according to the exemplary embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP). According to various embodiments, the controller 330 may include an identifying function for identifying the location of the transmitted PTRS. Here, the identifying function may be a command/code temporarily resided in the controller 330, a storage space that stores the command/code, or a part of circuitry of the controller 330.

FIG. 4 illustrates the communication interface in the wireless communication system according to various embodiments of the present disclosure. FIG. 4 shows an example for the detailed configuration of the wireless communication interface 210 of FIG. 2 or the communication interface 310 of FIG. 3 or the backhaul communication interface 220 of FIG. 2 if the BS 20, 30 is a relay node, More specifically, FIG. 4 shows elements for performing beamforming as part of the communication interface 210, 220 of FIG. 2 or the communication interface 310 of FIG. 3.

Referring to FIG. 4, the communication interface 210, 220 or 310 includes an encoding and circuitry 402, a digital circuitry 404, a plurality of transmission paths 406-1 to 406-N, and an analog circuitry 408.

The encoding and modulation circuitry 402 performs channel encoding. For the channel encoding, at least one of a low-density parity check (LDPC) code, a convolution code, and a polar code may be used. The encoding and modulation circuitry 402 generates modulation symbols by performing constellation mapping.

The digital beamforming circuitry 404 performs beamforming for a digital signal (for example, modulation symbols). To this end, the digital beamforming circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406 -N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

There are 5 types of reference signals (RS) in NR including demodulation reference signal (DM-RS)) for demodulation, phase tracking reference signal (PT-RS) for common phase error (CPE) compensation and carrier frequency offset (CFO)/Doppler estimation, channel-state information reference signal (CSI-RS) for downlink (DL) CSI acquisition and beam management, sounding reference signal (SRS) for uplink (UL) CSI acquisition and beam management and tracking reference signal (TRS) for fine tracking.

Embodiments of present disclosure offer advantages, including:

Enhancements for RSs to support high order modulation, e.g., 1024QAM.

RSs overhead reduction due to:
1) for stationary wireless links Doppler can be negligible and therefore time variation of the channel is slow, and
2) for certain scenarios, e.g., IAB, backhaul links are mostly LOS links and therefore the variation of the channel in frequency domain is also small.

In NR, two different configuration types for DM-RS are defined: Type 1 and Type 2, shown in FIG. 5. FIG. 5 shows Type 1 and Type 2 and, respectively, for each type, both one-symbol and two-symbol variants.

In LTE, it has been proposed to use time domain orthogonal cover code (OCC) 4 instead of OCC 2 to reduce the number resource elements (REs) used for DM-RS because of the very low Doppler encountered.

In NR IAB, time domain OCC can also be extended to OCC 4 and potentially further extended to even higher OCC level, e.g., OCC 8, to further reduce DM-RS overhead in the backhaul links because the positions of the relay nodes are fixed.

In the frequency domain (FD), the backhaul links are mostly LOS links and therefore the coherence bandwidth is larger. In NR, current FD OCC level is OCC 2. Because of the generally larger coherence bandwidth in IAB, the OCC level can be higher than 2, e.g., OCC 4 or 6 for type 1 and OCC 4, 6, or 8 for type 2 to reduce the overhead.

In NR, DM-RS can be multiplexed in code domain via CDM. CDM 2 and 4 are currently adopted and according to embodiments of the disclosure, it can also be extended higher level, e.g., CDM 6 or CDM 8 to further reduce the overhead.

It should be noted that the OCC level can be a joint OCC level in both time and frequency domains. For instance, time domain OCC 2 and frequency domain OCC 2 is effectively joint OCC level 4. In such a case, increasing OCC level can be performed across multiple domains.

In another embodiment, an approach is to configure DM-RS only for one slot/physical resource block (PRB) out of N slots/PRBs. In the frequency domain (FD), the channel for the PRBs without DM-RS can be estimated using interpolation of the channel estimation results for the PRBs with DM-RS.

Further, in the time domain (TD), because of the negligible time variation inherent in IAB channels, the channel for the slots without DM-RS can reuse the channel estimation results for the slots with DM-RS. This reduces the DM-RS overhead, since DM-RS needs to be repeated less frequently in the TD, since it changes relatively little from one slot to the next.

Another reference signal is PT-RS. PT-RS is mainly used for Frequency Range 2 (FR2, i.e. above 6 GHz, where PT-RS is needed). In NR IAB, FR2 is preferred for the backhaul links because it has wider available bandwidth and the highly directional transmission can mitigate interference. There are several issues to be considered for PT-RS, and these are described in the following paragraphs.

PT-RS Density

Time density of PT-RS depends on modulation coding scheme (MCS) and with the parameters shown in the MCS table (Table 2), the value range for MCS thresholds (for time density) are changed for the MCS table with 1024 QAM. For example, if Table 2 is used, the value range for MCS Index is 0-26.

MCS in column one decides the modulation order in column 2 and 3, and modulation order then decides TBS index in column 4. The time density of PT-RS is decided by MCS level, i.e., the first column of table 2. For different MCS level, PT-RS density changes from no presence, every 4 symbols, every other symbol, to every symbol.

Furthermore, PT-RS density may be further increased for the better CPE compensation and CFO/Doppler estimation required by higher order modulation. There are two alternatives forming embodiments of the present disclosure:
1. The maximum time domain density is already set at 1 per symbol and therefore cannot be further increased. However, the maximum frequency domain density is 1 per 2 PRB and therefore can be further increased. For example, the density can be increased to 1 per PRB or 2 per PRB or even higher as shown in Table 3 below. The MCS table (Table 2) may also be modified accordingly with more MCS thresholds and more time density values as shown below in Table 3. Note that it is possible that only a sub-table of Table 3 is adopted in the applicable standard depending on the density values. This caveat applies to all the following tables.

TABLE 3

| Scheduled MCS | Time density ($L^{PT-RS}$) |
|---|---|
| $I_{MCS}$ < ptrs-MCS$_1$ | PT-RS is not present |
| ptrs-MCS1 ≤ $I_{MCS}$ < ptrs-MCS2 | 4 |
| ptrs-MCS2 ≤ $I_{MCS}$ < ptrs-MCS3 | 2 |
| ptrs-MCS3 ≤ $I_{MCS}$ < ptrs-MCS4 | 1 |
| ptrs-MCS4 ≤ $I_{MCS}$ < ptrs-MCS5 | 0.5 |

FIG. 6 illustrates how the prior art PRB including a single PT-RS is updated to include a further PT-RS, giving a total of two per PRB.
2. More PT-RS ports can be configured associated with the same DM-RS port group and CPE can be averaged using multiple PT-RS ports.

For bandwidth (BW) density, two values (2 and 4) are agreed and there are two BW thresholds. However, for some scenarios, e.g., IAB, where much larger BW is used, the two values are not sufficient. Considering the fact that the quality of hardware at IAB nodes is much higher than UE, the phase noise of the backhaul links is likely to not be as bad as that experienced by UEs in access links. In this regard, the BW density can be further reduced to 8, 16 and even 32 and the BW density table according to an embodiment of the disclosure may e defined as in Table 4 below.

TABLE 4

| Scheduled bandwidth | Frequency density ($K^{PT-RS}$) |
|---|---|
| $N_{RB}$ < $N_{RB0}$ | PT-RS is not present |
| $N_{RB0}$ ≤ $N_{RB}$ < $N_{RB1}$ | 2 |
| $N_{RB1}$ ≤ $N_{RB}$ < $N_{RB2}$ | 4 |
| $N_{RB2}$ ≤ $N_{RB}$ < $N_{RB3}$ | 8 |
| $N_{RB3}$ ≤ $N_{RB}$ < $N_{RB4}$ | 16 |
| $N_{RB4}$ ≤ $N_{RB}$ | |

PT-RS Pattern

It has been agreed that a distributed pattern is used for PT-RS, which offers good performance for CPE compensation. However, for very high order modulation, inter-channel interference (ICI) becomes an important issue, in addition to CPE. Compared with a distributed pattern, a localized pattern is typically more suitable to combat ICI and thus more suitable for higher order modulation.

In this regard, it is possible to configure different patterns either semi-persistently or dynamically and the following alternative embodiments are described:
1. Semi-persistent configuration: distributed pattern or localized pattern is configured by upper layer, e.g., RRC or MAC CE. For each pattern, it is possible to use different BW/MCS threshold tables, RB/RE offset values and power boosting tables.
2. Dynamic configuration: since MCS can be indicated in DCI signaling dynamically, configuration can be performed implicitly using MCS, based on MCS table, e.g., Table 2. It is thus possible to use a table similar to the MCS threshold table as below (Table 5) but change the second column to represent PT-RS pattern. It can also be indicated in DCI in an explicit manner. Note that there could be multiple distributed/localized patterns, optimized for each scenario.

TABLE 5

| Scheduled MCS | Time density ($L^{PT-RS}$) |
|---|---|
| $I_{MCS}$ < ptrs-MCS$_1$ | PT-RS is not present |
| ptrs-MCS1 ≤ $I_{MCS}$ < ptrs-MCS2 | 4 |
| ptrs-MCS2 ≤ $I_{MCS}$ < ptrs-MCS3 | 2 |
| ptrs-MCS3 ≤ $I_{MCS}$ < ptrs-MCS4 | 1 |
| Scheduled MCS | Pattern |
| $I_{MCS}$ < ptrs-MCS$_1$ | Distributed pattern 1 |
| ptrs-MCS1 ≤ $I_{MCS}$ < ptrs-MCS2 | Distributed pattern 2 |
| ptrs-MCS2 ≤ $I_{MCS}$ < ptrs-MCS3 | Localized pattern 1 |
| ptrs-MCS3 ≤ $I_{MCS}$ < ptrs-MCS4 | Localized pattern 2 |

Number of PT_RS Ports

For stationary wireless links, especially for IAB, the number of antennas and antenna panels for backhaul links may be much higher than access links. Thus, transmission layers can be further increased. For example, for DL, it can be increased from 8 layers to 12 layers and for UL, it can be increased from 4 layers to 8 or even 12 layers. Moreover, multi-TRP/Panel can also be applied and one IAB node can communicate with multiple IAB nodes simultaneously. In this regard, more than 2 DM-RS port groups are possible and for each DM-RS port group, at least one PT-RS port is needed.

It has been agreed that only 2 PT-RS ports are needed for both UL and DL. Due to the reasons mentioned above, the number of PT-RS ports should scale with the number of DM-RS port groups. For example, if the number of DM-RS port groups is increased from 2 to 4, then the number of PT-RS ports should also be increased at least to 4.

It is also agreed that only one PT-RS port is needed and associated with each DM-RS port group. With more transmission layers, more PT-RS ports may be needed for each DM-RS port group. For example, 2 or more PT-RS ports can be associated with the same DM-RS port groups.

PT-RS is closely associated with DM-RS and therefore any DM-RS overhead reduction may impact PT-RS.

In one of the DM-RS overhead reduction embodiments above, some subframes/slots might not include DM-RS due to the much smaller time domain variation experienced by a fixed base station (gNB) without significant Doppler, as shown in FIG. 7a.

However, phase noise is not relevant to Doppler and still exists. In such a case, for subframe/slots 2 to N, PT-RS in subframe/slot 1 can be extended to the remaining slots as shown in FIG. 7b.

DM-RS overhead reduction can be applied in the frequency domain. It has been agreed that RB offset is introduced to determine PT-RS position based on radio network temporary identifier (RNTI). In such a case, the PT-RS position after RB offset might be in the PRB without DM-RS. When such situation happens, the following alternatives are provided:
1. Revise the RB offset equation and ensure the minimum step size for RB offset is N PRB when there is only 1 of out N PRBs containing DM-RS;
2. Follow the same RB offset equation. If PT-RS is located in a PRB without DM-RS, move it to the closest PRB with DM-RS.

Another approach for DM-RS overhead reduction is to have dynamic DM-RS pattern from subframe/slot to subframe/slot, e.g., OCC 2 to OCC 4. It has been agreed that RE offset is introduced to determine PT-RS position within one PRB. This overhead reduction approach may cause a problem for RE offset if RE offset is configured by RRC. When configured by RRC, the RE offset is semi-persistent but with dynamic configuration of DM-RS, the RE offset can be dynamic and therefore there is a mismatch. In such a case, there are two alternatives:
1. Use implicit RE offset to override the RRC configuration;
2. Choose the closest subcarrier with the associated DM-RS.

Embodiments of the present disclosure can also be applied in connection with other reference signals: CSI-RS, TRS and SRS.

TRS is essentially a one port CSI-RS so these RSs are handled together. Due to the LOS channel condition, coherence bandwidth is larger and the same overhead reduction schemes can be applied to CSI-RS, TRS and SRS.

Note that for all the reference signal overhead reduction schemes in the frequency domain, since the PRBs allocated to a UE may not be adjacent to each other, the overhead reduction should depend on the PRB allocation as shown in FIG. 8.

FIG. 8a shows the PRBs allocated to a UE and each PRB includes DM-RS.

FIG. 8b shows how in cases where multiple PRBs are allocated to a UE, then it is possible to reduce the DM-RS overhead by omitting DM-RS from at least one PRB where multiple PRBs are allocated. In this case, PRB i includes DM-RS, but in the adjacent PRB i+1, it is possible to omit DM-RS.

In the case of PRB j, there is only a single PRM allocated, so it must include DM-RS.

In the case of PRB k, PRB k+1 and PRB k+2, three PRBs are allocated and so DM-RS can be omitted from PRB k+1.

In summary, if multiple adjacent PRBs are allocated, DM-RS can be removed from selected ones of these to reduce the DM-RS overhead.

It is desirable to define a threshold for the number of adjacent PRBs so that DM-RS can be removed from selected ones of these. If the number of adjacent PRBs is larger than this predefined threshold, then DM-RS reduction can be performed but otherwise, it cannot be done. The threshold is indicated to the UE in one of three ways:
1: Pre-defined i.e. the threshold is stored in the UE and does not need to be signaled or otherwise communicated in real-time;
2: Implicitly signaled, so that the threshold implicitly depends on an external parameter available to the UE, such as modulation order, MCS level; or
3: Explicitly signaled, so that a specific message is sent to the UE. This may be via, e.g., RRC (semi-persistent), or MAC CE, DCI (dynamic).

Furthermore, activation/deactivation of the reference signal overhead reduction mode should be indicated to the UE and two possible options are:
1: Implicitly derived from previously measured channel conditions. In other words, the UE monitors channel conditions and decides if reference signal overhead reduction mode should be activated. This may be based on defined channel conditions which must be met.
2: Explicitly signaled, so that a specific message is sent to the UE to activate reference signal overhead reduction mode. This may be via e.g., RRC (semi-persistent), MAC CE, DCI (dynamic)

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by a wireless network for a stationary wireless link in a wireless network, wherein the method of configuring comprises the step of:
   activating a DM-RS (demodulation-reference signal) overhead reduction mode in case that a predetermined condition is met,
   determining a number of adjacent allocated physical resource blocks, and
   in case that the number exceeds a predetermined threshold,
   removing the DM-RS from at least one of the adjacent allocated physical resource blocks, and
   allocating a phase tracking reference signal (PT-RS) in the nearest subcarrier associated with the DM-RS.

2. The method of claim 1, wherein the predetermined condition comprises one of:
   a message to activate the DM-RS overhead reduction mode; or
   previously measured channel conditions.

3. The method of claim 1, wherein activating the reference signal overhead reduction mode further comprises of:
   utilising an orthogonal cover code (OCC) to encode the reference signal to reduce the signaling overhead associated therewith.

4. The method of claim 3, wherein the OCC is utilised across a plurality of domains selected from: time, frequency and code.

5. The method of claim 1, wherein removing the reference signal from at least one of the adjacent allocated physical resource blocks is performed according to one of the following schemes:
   in a predefined manner;
   in an implicit manner, based on an external parameter; and
   in an explicit manner by a signal to active the DM-RS overhead reduction mode.

6. The method of claim 5, wherein the predefined manner includes pre-storing instructions in a user equipment (UE).

7. The method of claim 5, wherein the external parameter is selected from one of modulation order or modulation coding scheme (MCS) index.

8. The method of claim 5, wherein the signal may sent to a UE via radio resource control (RRC), medium access control control element (MAC CE), or downlink control information (DCI) signaling.

9. The method of claim 1, wherein the allocation of the PT-RS comprising:
   allocating the PT-RS by an implicit signaling associated with a resource element (RE) offset.

10. A wireless network for a stationary wireless link, comprising:
    at least one transceiver; and
    at least one processor operably connected to the at least one transceiver,
    wherein the at least one transceiver is configured to:
       activate a DM-RS (demodulation—reference signal) overhead reduction mode in case that a predetermined condition is met,
       determine a number of adjacent allocated physical resource blocks, and
       in case that the number exceeds a predetermined threshold, remove a DM-RS from at least one of the adjacent allocated physical resource blocks, and
       allocate a phase tracking reference signal (PT-RS) in the nearest subcarrier associated with the DM-RS.

* * * * *

UNITED STATES PATENT AND TRADEMARK OFFICE
CERTIFICATE OF CORRECTION

| | |
|---|---|
| PATENT NO. | : 11,509,438 B2 |
| APPLICATION NO. | : 17/054129 |
| DATED | : November 22, 2022 |
| INVENTOR(S) | : Qi |

It is certified that error appears in the above-identified patent and that said Letters Patent is hereby corrected as shown below:

On the Title Page

Item [30], delete "(GB) 1807654" and insert --(GB) 1807654.7--

Signed and Sealed this
Third Day of January, 2023

Katherine Kelly Vidal
*Director of the United States Patent and Trademark Office*